Sept. 7, 1954

W. D. HINES 2,688,308

SUCKLING AND FARROWING CRATE

Filed June 12, 1953

INVENTOR
WILLIAM D. HINES

BY
Semmes & Semmes
ATTORNEYS

Sept. 7, 1954  W. D. HINES  2,688,308
SUCKLING AND FARROWING CRATE
Filed June 12, 1953
2 Sheets-Sheet 2
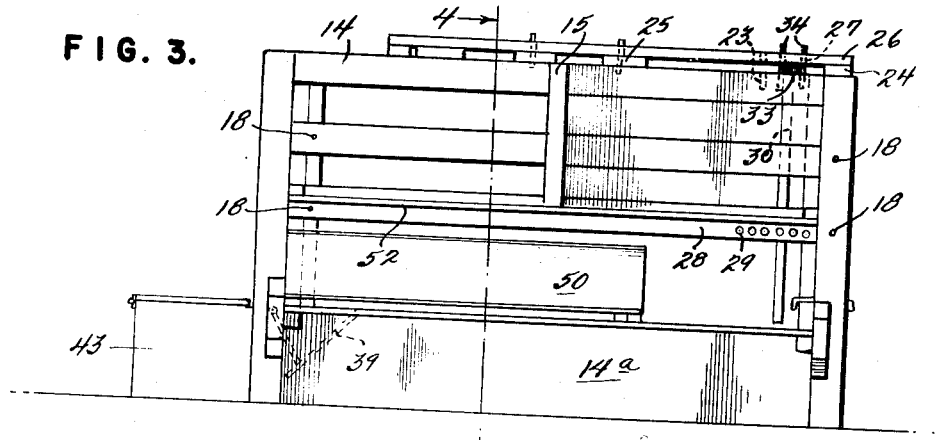
FIG. 3.
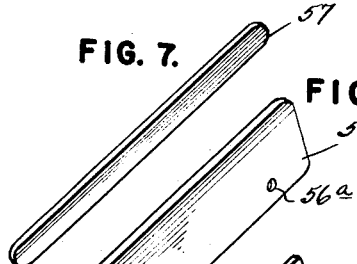
FIG. 7.
FIG. 8.
FIG. 9.
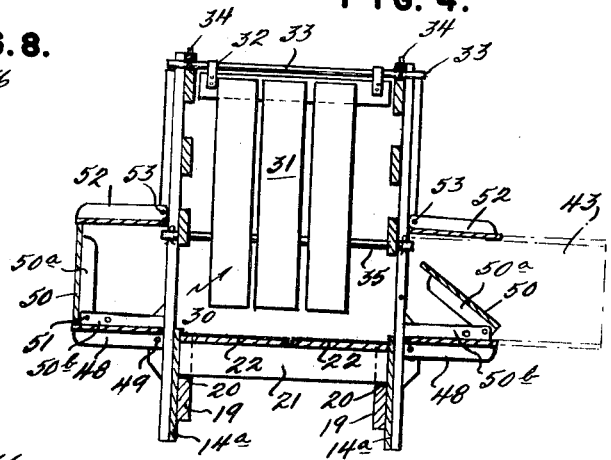
FIG. 4.
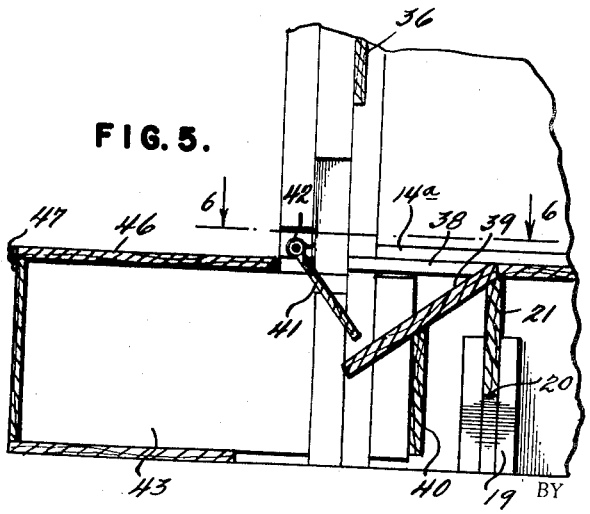
FIG. 5.
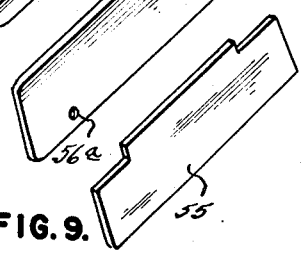
FIG. 6.
INVENTOR
WILLIAM D. HINES
BY
Semmes & Semmes
ATTORNEYS Patented Sept. 7, 1954

2,688,308

UNITED STATES PATENT OFFICE 2,688,308

SUCKLING AND FARROWING CRATE

William D. Hines, Chestertown, Md.

Application June 12, 1953, Serial No. 361,204

11 Claims. (Cl. 119—20)

The present invention relates generally to improvements in devices for use in animal husbandry and more specifically to devices for use as suckling and farrowing pens or crates.

As is well known, there is considerable danger to newly born offspring during the farrowing period of hogs. When a sow is in labor, and incognizant of danger to the offspring, there is a possibility of the small pigs being crushed by the sow, especially when birth is accomplished unattended.

Prior devices have proposed reducing new born pig mortality by providing sheltered areas for the new born litter into which spaces the sow cannot walk or lie thus reducing the possibilities of the sow crushing or otherwise injuring pigs. The present invention recognizes new born pig mortality, however, as the result of three basic danger sources working singly or in combination. One object of the present invention is to prevent all possibility of new born pigs being crushed by the farrowing sow.

Another object of the invention is to provide a suckling and farrowing crate primarily adapted to protect the young pigs from the sow immediately after birth and which is also adapted to provide a means for enabling the pigs to nurse the sow without danger of being crushed after birth.

Another object of the present invention is to provide a suckling and farrowing pen or crate which affords maximum accessibility to the sow for the purpose of cleaning the sow and the interior of the pen, and otherwise preparing her for farrowing in disease-free, infection-free, and parasite-free condition during pre-natal, farrowing and nursing periods.

Another object of the present invention is to provide a farrowing pen or crate having an adjustable gate member which can be moved longitudinally of the farrowing pen to accommodate different size sows and also to position the rear of the sow in close abutment with a second end gate which is vertically adjustable to facilitate birth of the pigs.

An additional object of the present invention is to provide a farrowing pen in which means are included whereby immediately after birth the pigs are passed into a receiving box, and means are provided to thereafter prevent the pigs from returning to the farrowing pen.

A still further object of the present invention is to provide a farrowing pen of simple and effective construction wherein a minimum number of means are required to secure the various members of the pen together, the majority of the elements forming the pen are held together by gravity, boards, and/or removable pins.

A still further object of the present invention is to provide a farrowing pen having foldable elements so that the pen can be readily converted from a farrowing to a suckling pen and wherein the members forming a nursing platform can be folded down to be out of the way, and the top thereof will fold against the side, the platform members and top folding in such a position as to maintain maximum accessibility to the sow from outside the pen.

A further and important object of the present invention is to provide a farrowing pen in which positive separation of newly born pigs from the mother sow is effected through a ramp structure in combination with adjustability of the pen length for adapting it to different sized sows.

Other objects and advantages of the present invention will be apparent from the following detailed description of an embodiment of the invention taken together with the accompanying drawings in which:

Fig. 3 is a side elevational view of the device of Fig. 1;

Fig. 4 is a sectional view taken on line 4—4 of Fig. 3;

Fig. 5 is a fragmentary enlarged view of means for separating newly born pigs from the mothering sow;

Fig. 6 is a plan view of a fragmentary section taken along the line 6—6 of Fig. 5;

Fig. 7 is a perspective view of means for preventing rearward movement of a sow;

Fig. 8 is a perspective view of end closing means for the pen when utilized as a nurser; and Fig. 9 is a perspective view of ramp covering means when the pen is utilized for nursing purposes.

Figure 1:
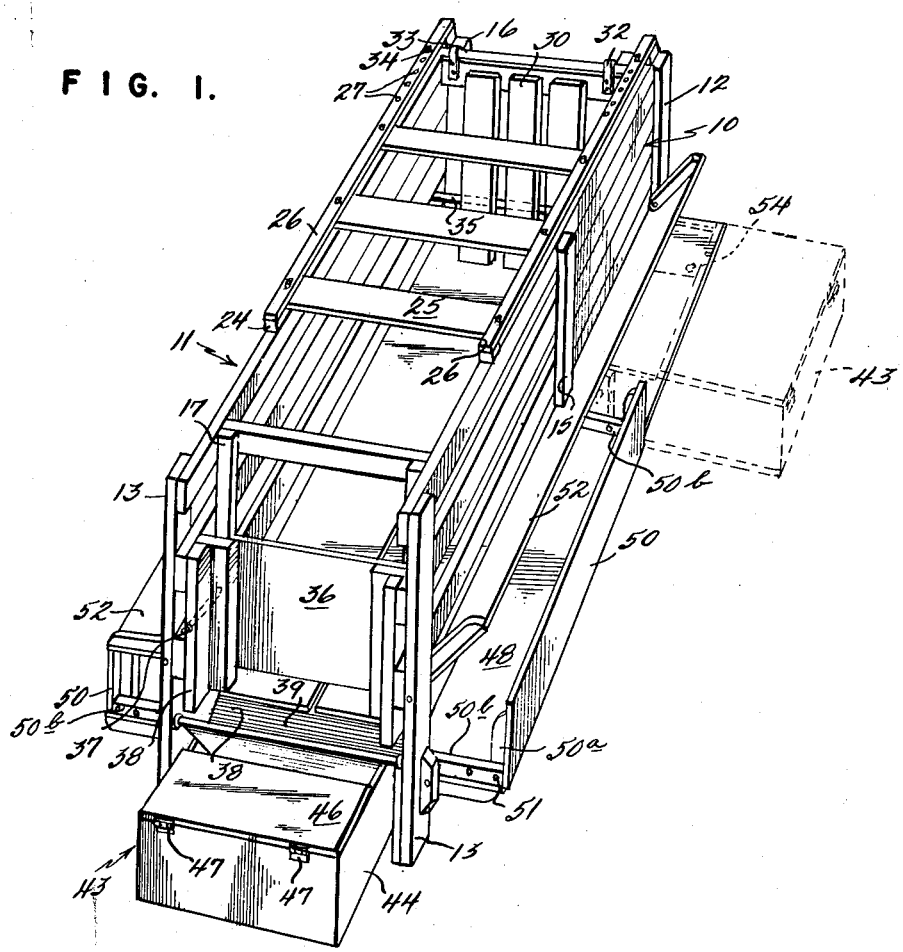
Fig. 1 is a perspective view of the pen of the present invention.

The suckling and farrowing crate or pen consists in side members generally designated 10 and 11 which are composed of end upright posts 12 and 13 serving as corner posts. Side boards, or slats such as shown at 14, are interconnected by posts 12 and 13 and an intermediate post 15 for rigidity. Preferably that half of the pen adapted for containing the sow's head has entirely solid side walls whereas, at the opposite end, adapted for holding the rear of the sow, spaced boards are used for the purpose of easy accessibility and ventilation.

End frame members 16 and 17 are interposed between and secured to the side members 10 and 11 by means of only 8 bolts shown at 18. These are the only bolts utilized to hold the formed structural members together to form the exterior of the pen. The remainder of the elements, as will appear hereinafter, are held by means of boards and/or gravity. This results in an extremely simple construction which is easy to assemble and disassemble.

On the side boards 14a there are affixed supporting lugs or posts 19 having slots 20 therein as shown in Figs. 4 and 5. The slots 20 are adapted for supporting cross members 21 by gravity. Floor boards 22 are removably supported on cross members 21 and can be easily removed for cleaning purposes. These also are only maintained in position by gravity and the limiting side walls.

The top side boards 14 have a plurality of bores therein shown at 23. Superposed on the top side boards 14 are blocks 24 and top cross members 25. On top of the blocks 24 and cross members 25 are longitudinally extending stringers 26 which are affixed at their points of crossing the blocks 24. As shown in Figs. 1 and 3 respectively, the cross members are held in place by removable pins drifted through stringers 26, the members 25 and boards 14. The top stringers 26 have holes 27 therethrough directly over the bores 23 for purposes hereinafter to be set forth.

A longitudinal side board designated at 28 has transverse openings 29 therein, spaced in accordance with the bores 23 and holes 27. A gate member 30 is adapted to adjustably close one end of the pen. This gate member 30 is comprised of a plurality of vertically depending boards 31 affixed at their upper ends by brackets 32 to a transversely extending rod 33. The gate member 30 can be adjusted longitudinally of the pen by moving the rod 33. Pins 34 are positioned on each side of the rod 33 and extending through holes 27 and into bores 23. A transverse bar 35 is insertable through transverse openings 29 to secure the position of the lower end of gate member 30. This relationship is shown in Fig. 4. By means of this adjustable gate member 30, the space within which a sow is to be confined can be longitudinally adjusted so as to insure positioning of the rear or rump of the sow in close proximity to the opposite end of the pen.

At the opposite end of the pen there is a vertically adjustable gate 36 which can be secured in position by means of a pin 37 extending through a hole in upright member 38 as shown in dotted lines in Fig. 1. The purpose of adjustability of this gate is so that it will rest just above the rump of the sow.

Beneath the gate 36, the floor boards 22 are cut away as indicated at 38 to form a rectangular opening therein. Inserted in this rectangular opening, in alignment with floor boards 22, is a downwardly inclined ramp 39 supported on a cross member 21 and a second cross member 40. Pivotally mounted on upright end posts 13, in proximity to the ramp 39, is a gate 41 which is of such a length that when in the position shown in Fig. 5, the lower end thereof will be in close proximity to the ramp 39. This gate 41 is biased to the position shown in Fig. 5 by means of a spiral spring 42. Any similar means to bias the gate 41 to this closing position with respect to ramp 39 can be utilized such as counter weights, a gravity mounting, or other suitable means. Gate 41 may be secured to the pen or to the receiving box by any suitable means, dependent upon the peculiar requirements of the builder.

Figure 2:
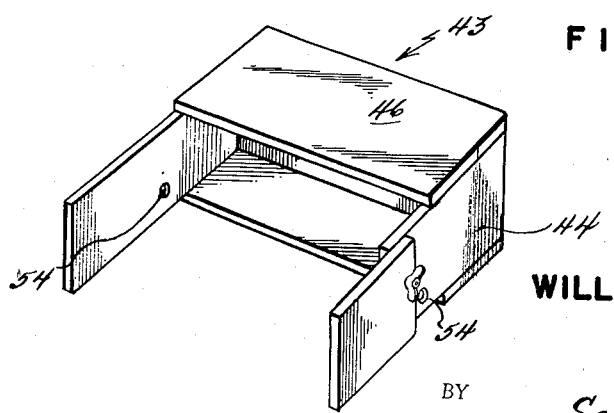
Fig. 2 is an enlarged perspective view of a separate box for new born pigs.

A pig receiving box, shown in detail in Fig. 2 is, when the pen is to be used for farrowing purposes, inserted in juxtaposition with the ramp 39 and gate 41 as shown in Figs. 1 and 5. This pig receiving box 43 has side members 44. A top 46 may be hinged at 47 so that the top can be raised as desired to remove pigs therefrom. During farrowing, the gate 30 is so adjusted as to position the sow's rear end in abutting relationship with the gate 36 so that when a pig is born, it will slide down ramp 39 and open gate 41 to thereby drop it into the pig receiving box 43 in which straw may be placed if desired. Immediately thereafter the gate 41 will return to the position shown in Fig. 5 and prevent the pig from returning into the farrowing pen where it could be trampled or laid on.

A heat source, not shown, may be incorporated with the receiving box for the purpose of drying and warming the newly born pigs and training them to seek this source of heat; to induce them to stay away from the sow except when actually nursing, and thereby to lessen the chance of injury.

After all the pigs have been born and it is desired to permit them to nurse the sow, the farrowing pen can be converted for suckling purposes. The means for accomplishing this purpose consist of enclosures or runways affixed to the sides of the pen in such a manner that they can be swung out of the way. The enclosures consist of pivotally mounted laterally extending members 48, pivoted at 49, and which can be folded downwardly against the sides of the farrowing pen. Side members 50 are pivoted at 51 to these base members 48 so that they can be raised into vertical position as shown at the left hand side of Fig. 4 or turned into the position shown at the right hand side of Fig. 4 against the member 48 and swung out of the way together therewith as shown. Pivotally mounted top members 52 are pivoted at 53 so that they can be raised against the side of the pen and out of the way to permit accessibility to the pen interior for cleaning and for access to the sow. When the members 48, 50 and 52 are in the position shown at the left hand side of Fig. 4, there is a runway or passageway around the side of the pen on each of the longitudinal sides thereof. Preferably the lowermost side board 14a is so positioned as to be slightly above the floor boards 22 of the pen so that the sow can obtain a foot purchase or grip thereon and accordingly lift herself as desired.

When nursing, the pig-receiving box 43 is placed in the position indicated in dotted lines in Fig. 1. The member 52 assumes a contiguous position to the member 50 and entirely encloses the run formed thereby. Apertures 54 are provided in each of the side members 44 of the box 43 for receiving pins or the like passable through corresponding apertures 56a in a board 56 and hinge member 50a or 50b for securing the pig box 43 in the position shown in dotted lines in Fig. 1. Manifestly, any desired means of securing these members can be utilized within the scope of the present invention.

Referring to Fig. 2 of the drawings, it will be appreciated that one vertical side element 44 of the box 43 may be cut as shown with overlapping extension for use in farrowing. This extension may be removed for nursing and the aperture 54 of the element 44 aligned with a corresponding aperture of the hinge element 50b for receiving a bolt and nut or pin.

The member 55 shown in Fig. 9 is adapted to cover the cut-out portion 38 of the floor boards when the pen is to be used for nursing. This provides a solid floor. The board 56 shown in Fig. 8 is utilized by being inserted across the open ends formed by the members 48, 50 and 52 as shown in Fig. 4 and under the gate 36. A similar member 56 is placed at the other end of pen in a similar position. This effectively closes off the ends of the nursing runways. Apertures 56a are adapted to align with corresponding apertures in the hinge members 50b for receiving locking pins adapted to support the runways against displacement.

There is additionally provided a board 57 adapted to extend transversely immediately above the floor of the pen and between the slats, slightly inwardly disposed from the gate 36. This prevents the sow from backing against any of the pigs during nursing.

When the pen is arranged for nursing as set forth above, the pigs are able to move around on all sides of the sow. Due to this arrangement the pigs are enabled to nurse without danger of being crushed.

It will be seen that the present invention consists in a rectangular pen structure which has access means therefor, and an adjustable partition or end member between the sides of the pen. This partition member is adjustable longitudinally of the pen, being secured by a rod 35 passing outwardly across the partition and through apertures cut through the sides of the pen. At the rear end of the structure there is a vertically adjustable gate member designed to rest immediately above the sow's rump. The entire pen structure is raised from the ground sufficient to provide space for an inclined delivery chute or ramp at the end of the pen adjacent the vertically adjustable gate member. In abutting relation with the delivery chute is a box adapted to hold the pigs, after being born, until such time as they are removed for nursing.

At the sides of the pen a nursing platform is provided having the floor raised slightly above the floor of the pen. The nursing platform and enclosure members forming the same are supported by a foldable series of supports hingedly secured to the pen so that they can be folded away during a period of non-use and in such position as to give maximum view and manual accessibility to the farrowing sow and her pigs.

The feature of adjustability in length permits definitely holding the sow in proper farrowing position and there is a positive separation of the newly born pigs from the sow by means of the delivery chute and the gate cooperating therewith to prevent the pigs from returning into the farrowing pen. The present invention accordingly provides a very useful and yet simple and effective farrowing pen which can be utilized also for the purpose of nursing and the nursing platforms can be folded out of the way during a period of non-use.

Manifestly, changes in details of construction will be apparent to those skilled in the art to which the present invention pertains without departing from the spirit and scope of the present invention as defined in the appended claims.

I claim:

1. A confining pen for use by sows in giving birth to young pigs comprising means resting on a support defining an enclosure suitable for positioning a sow during birth, said enclosure means being provided with a substantially horizontal floor at an elevation above that of the support, said floor being provided adjacent one end with an inclined ramp leading downwardly and outwardly to provide a chute for conveyance of newly born pigs immediately as they are born, and a second enclosure means adjacent said ramp and having a floor below the level of said first-mentioned floor, whereby the newly born pigs are confined away from the sow.

2. A pen as defined in claim 1 further comprising wall members forming sides for the first enclosure means, a pen length-adjusting gate operatively associated with said wall members, to restrict longitudinal movement of the sow and to position the sow for birth, and end members for said first enclosure means.

3. A pen as claimed in claim 2, said wall members having a plurality of longitudinally spaced wells in the tops thereof, transverse suspension means engaging an upper portion of the pen length adjusting gate, pins insertable in the wells to secure the gate suspension means on opposite sides thereof, a plurality of transverse bores in the wall members in proximity to the bottom thereof, said bores being spaced similarly to the spaced wells, gate positioning means removably engaging the gate adjacent the bottom thereof for seating within the transverse bores of the wall members.

4. A pen as defined in claim 2, including a removable floor in the said first enclosure, forward and rearward sections for said floor, the rearward section of the floor pivotally engaging the forward section of the floor and thereby forming the ramp.

5. In a pen as defined in claim 2; an entrance gate to said upper level enclosure which is laterally and longitudinally fixed with respect to said ramp, means of vertical adjustment for the gate with respect to the height of said gate over said ramp, a positioning gate in the upper level enclosure spaced apart from the entrance gate and including means of longitudinal adjustment for the positioning gate and means for holding the positioning gate in longitudinal adjustment with respect to the distance of said positioning gate from said ramp, partition means pivotally engaging the pen adjacent the ramp to permit uni-directional passage of solid objects such as the bodies of new born pigs from said first enclosure to said second enclosure.

6. In a pen as claimed in claim 1, a pivoted gate in proximity to said delivery chute said gate being movable arcuately downwardly only and means biasing said gate to contacting position with said delivery chute to prevent re-entry of the pigs into the pen.

7. In a pen as claimed in claim 6, a pig box separable from said pen, said box being insertable under said chute and said pivoted gate during farrowing periods and attachable to a side wall during nursing periods.

8. In a pen as claimed in claim 7, a vertically adjustable end gate mounted above said delivery chute and adapted for adjustment above a sow's rump during farrowing periods.

9. In a pen as claimed in claim 1, means for selectively converting said pen from a farrowing unit to a nursing unit, said means comprising base members foldably pivoted on the longitudinal sides of the pen, side members foldably pivoted on the free sides of said base members and top closure members pivoted on the pen above the base members, all said members in closed position forming a feeding runway on two sides of the pen and opening thereinto.

10. In a pen as claimed in claim 9, said base members being foldable downwardly against the sides of the pen along with said side members and said top members being foldable upwardly against the sides of the pen whereby packing and shipping of the pen is facilitated.

11. In a pen as claimed in claim 10, means for covering said delivery chute during nursing periods and end boards slidably insertable across and spaced from the ends of the pen for closing the ends of the feeding runways and to extend the runways around four sides of the pen, removable means connecting at least one end board and the feeding runways to lend support to said runways.

References Cited in the file of this patent

UNITED STATES PATENTS

| Number | Name | Date |
|---|---|---|
| 391,858 | Randleman | Oct. 30, 1888 |
| 436,902 | Osborn | Sept. 23, 1890 |
| 1,230,237 | Sturm | June 19, 1917 |
| 1,361,660 | Adix et al. | Dec. 7, 1920 |
| 2,619,934 | Bartelt | Dec. 2, 1952 |